United States Patent [19]

Meunier et al.

[11] Patent Number: 4,939,836
[45] Date of Patent: Jul. 10, 1990

[54] METHOD FOR THE FABRICATION OF A MAGNETIC RECORDING/READING HEAD FROM A MAGNETIC SUBSTRATE

[75] Inventors: Paul-Louis Meunier, Paris; Alain Penot, Palaiseau; Jean-Marc Coutellier, Maurepas; Claude Bussac, Ris Orangis, all of France

[73] Assignee: Compagnie Europeenne de Composants Electroniques LCC, Courbevoie, France

[21] Appl. No.: 366,955

[22] Filed: Jun. 16, 1989

[30] Foreign Application Priority Data

Jun. 24, 1988 [FR] France ............... 88 08526

[51] Int. Cl.$^5$ ............... G11B 5/42
[52] U.S. Cl. ............... 29/603; 360/119; 360/122
[58] Field of Search ............... 29/603; 360/119–121, 360/122

[56] References Cited

U.S. PATENT DOCUMENTS 3,332,145  7/1967  Klindenberg ............... 29/603 X
4,821,403  4/1989  Rolland et al.

FOREIGN PATENT DOCUMENTS 2041015  2/1972  Fed. Rep. of Germany.

OTHER PUBLICATIONS

Patent Abstracts of Japan, vol. 10, No. 195 (P-475) [2251], 9 Juillet 1986; & JP-A-61 39 207 (Victor Co. of Japan Ltd.) 25-02-1986.
Patent Abstracts of Japan, vol. 6, No. 2 (P-96) [880], 8 Janvier 1982; & JP-A-56 127 916 (ALPS Denki K.K.) 07-10-1981.
Patent Abstracts of Japan, vol. 11, No. 375 (P-644) [2822], 8, Dec. 1987; & JP-A-62 145 515 (Seiko Epson Corp.) 29-06-1987.
Patent Abstracts of Japan, vol. 11, No. 253 (P-644) [2822], 8 Dec. 1987; & JP-A-62 145 515 (Seiko Epson Corp.), 29-06-1987.

Primary Examiner—Carl E. Hall
Attorney, Agent, or Firm—Pollock, VandeSande & Priddy

[57] ABSTRACT

A method for fabricating magnetic recording/reading heads. A substrate made of magnetic material is provided with a groove of a predetermined width. The surface of the substrate bearing the groove becomes the active face for the magnetic head. The face of the substrate having the groove is ground, and then filled with a non-magnetic material to form a gap. The filling causes the non-magnetic material to jut out of the groove. The material which juts out is ground off until the level of the substance is reached.

7 Claims, 4 Drawing Sheets

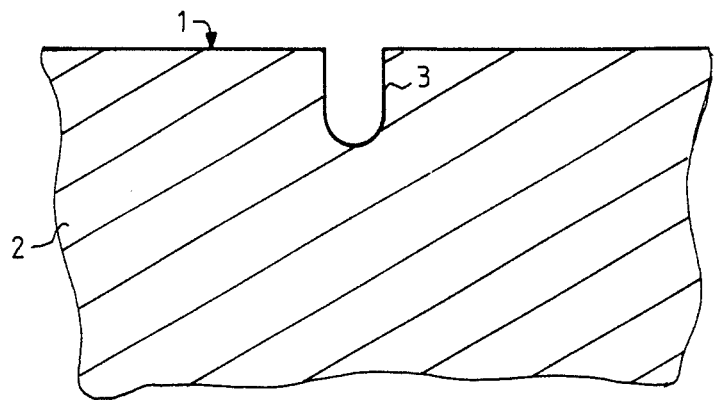
FIG_1
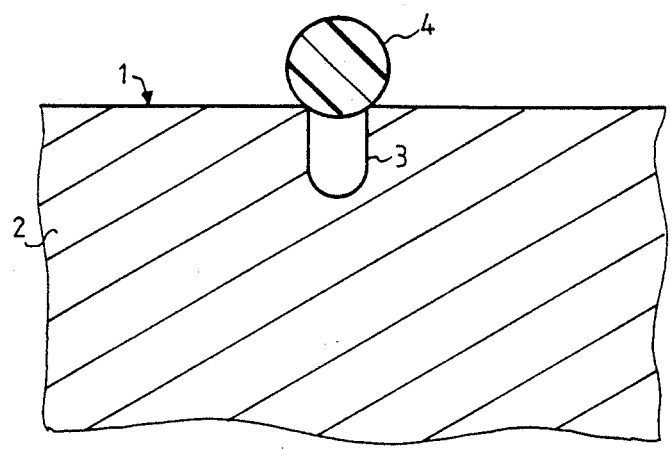
FIG_2
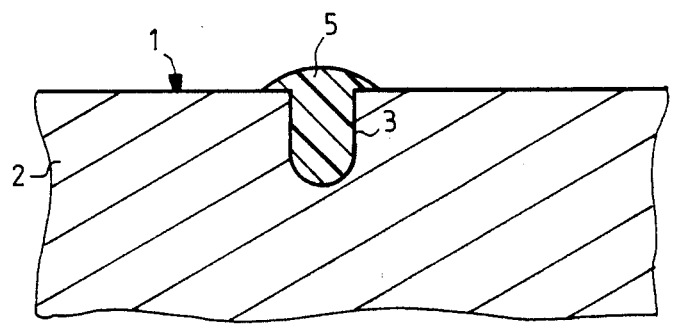
FIG_3

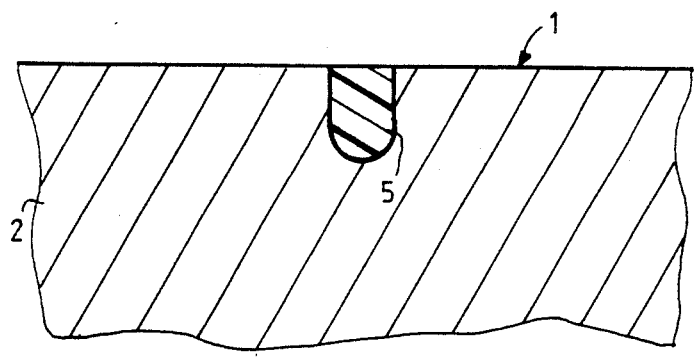
FIG_4
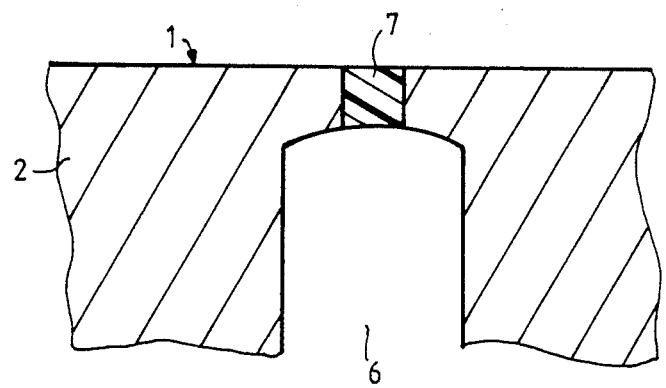
FIG_5
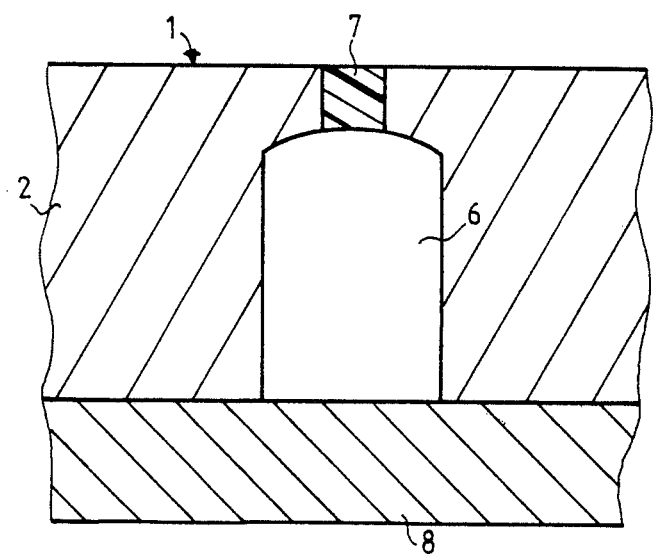
FIG_6

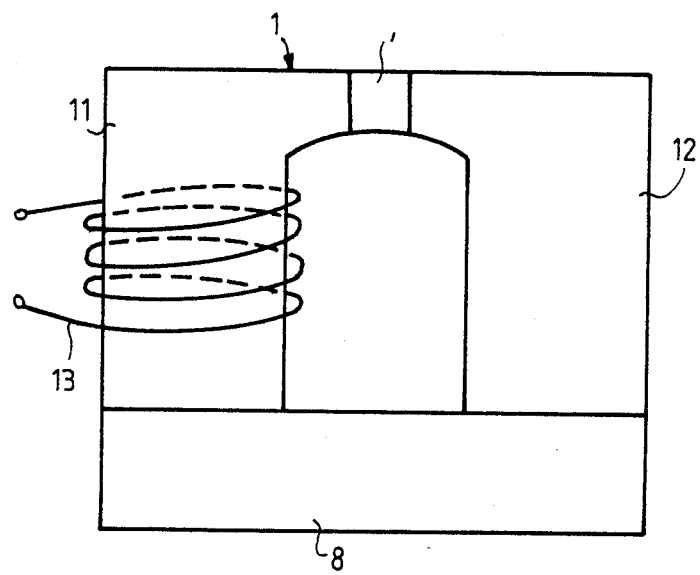
FIG_7
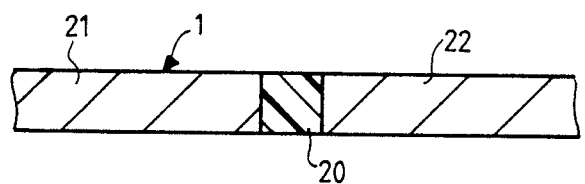
FIG_8
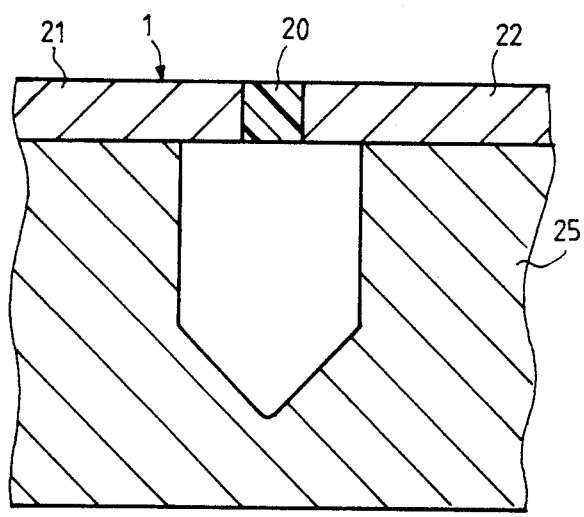
FIG_9

FIG_10
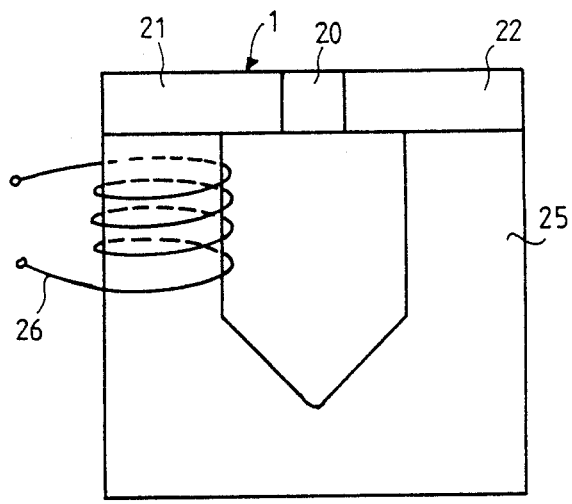

METHOD FOR THE FABRICATION OF A MAGNETIC RECORDING/READING HEAD FROM A MAGNETIC SUBSTRATE

BACKGROUND OF THE INVENTION

1. Field of the Invention

The invention relates to a method for the fabrication of at least one magnetic recording/reading head from a magnetic substrate.

2. Description of the Prior Art

A magnetic reading and/or recording head is formed by a ring-shaped magnetic circuit cut by a narrow gap consisting of a non-magnetic material.

Magnetic heads can be classified under three major groups:

massive heads are made by machining and joining two semi-heads, made of magnetic material, such as video heads (VHS heads) or analog audio heads. The coiling of these heads is done at the end of the fabrication method;

thin layer heads are made by successive deposition of magnetic, dielectrical and conductive materials. These layers undergo masking and etching operations which enable the magnetic circuit, the gap and the conductive turns to be obtained;

heads having, on either side of the gap, a magnetic metallic alloy with a thickness that varies between 0.1 and 40 micrometers, the rest of the magnetic circuit and the conductive turns being made in the same way as for the massive heads. These are so-called MIG (metal in gap) heads which are used today in 8 mm. or RDAT (rotary digital audio tape) systems.

In the method of fabrication of a magnetic recording/reading head, it is often necessary to machine a heterogeneous part, formed by the association of a magnetic material (ferrite for example) and a non-magnetic material (glass for example). This is the case, notably, for the fabrication of the magnetic head described in the French patent application by the present applicant, filed under No. 87 14824. If a magnetic thin layer has to be deposited on this machined head, as for the magnetic head described in the French patent application by the present applicant, filed under No. 87 14820, it is necessary to have an excellent surface quality.

However, grinding a heterogeneous part always results in a different degree of wear on the two materials forming this heterogeneous part. This difference in wear is all the greater when the materials have different hardnesses. This is particularly so in the case of ferrite which is usually ground with a mixture of diamond powder, and of glass which is usually ground with cerium oxide. The plane thus machined therefore has a planar surface defect which may be incompatible with the requirements of additional steps for making the magnetic head.

To overcome this problem, the invention proposes a new method for the fabrication of at least one magnetic recording/reading head which enables the grinding, at different stages, of the magnetic and non-magnetic materials forming the active face of the head.

SUMMARY OF THE INVENTION

An object of the invention is to provide a method for fabricating at least one magnetic reading/recording head from a substrate made of magnetic material, the magnetic head having an active face defined by the magnetic poles of the head, separated by a gap, comprising the following steps:

making a groove of a predetermined width on a face of the substrate designed to become the active face of the head;

grinding the face of the substrate that has the groove;

filling the groove with a non-magnetic material designed to form the gap to a level where this non-magnetic material juts out of the groove;

4th step: grinding the material that juts out until the substrate is reached;

machining the substrate from a face other than the active face to obtain a gap of a determined depth;

fixing, on the magnetic poles, a part to close the magnetic field; and, positioning a coil in the magnetic circuit formed by the poles and said closing part.

BRIEF DESCRIPTION OF THE DRAWINGS

The invention will be better understood and other advantages will appear from the following description, given as a non-restrictive example and made with reference to the appended drawings, of which:

FIGS. 1 to 4 illustrate the first four steps of the method according to the invention;

FIGS. 5 to 7 illustrate a first variant of the subsequent part of the method according to the invention;

FIGS. 8 to 10 illustrate a second variant of the subsequent part of the method according to the invention.

DESCRIPTION OF PREFERRED EMBODIMENTS

By way of an example of fabrication, the description shall concern the making of only one magnetic head, but the invention can be advantageously used for the simultaneous fabrication of a great number of magnetic heads using one and the same substrate.

According to the first step of the method according to the invention, a groove is made, by any means known to those skilled in the art, on one of the faces of a substrate made of magnetic material, for example ferrite. This is what is shown in FIG. 1, where the face 1 of the substrate 2 is hollowed out by the groove 3. By way of example, the groove 3 may have a width of 200 $\mu$m for a depth of 300 $\mu$m.

The second step of the method consists in grinding the face 1 of the substrate 2. The grinding operation may be conducted according to methods well known to those skilled in the art. For example, if the substrate 2 is made of ferrite, the grinding may be done with a diamond powder.

It is preferable to conduct the grinding operation after the groove-making operation, because the groove-making operation may leave burrs.

The third step of the method consists in filling the grooves with a non-magnetic material, for example glass, said non-magnetic material being designed to form the gap. A particularly advantageous way to fill a groove as small sized as the above-mentioned ones, consists in using a glass rod. One and the same rod can then be used to make the gaps of an entire row of magnetic heads. FIG. 2 shows an axial view of a glass rod 4 deposited on the groove 3. The diameter of the rod 4 has been designed so that once the glass is placed in the groove, it juts out of this groove. This is shown in FIG. 3, where the dielectric material 5 is seen to jut out of the groove 3. The groove can be filled by taking the glass rod to a temperature greater than its melting point. This operation can be done by heating the substrate/glass rod set, the melting point of glass being appreciably below that of the substrate. The rod may also be melted by localized heating.

The fourth step of the method consists in grinding the glass that juts out of the groove. Using grinding techniques well known to those skilled in the art, for example by means of cerium oxide powder, the glass can be ground until it is flush with the already ground surface of the substrate. This is what is shown in FIG. 4. Thus, the recess in the glass with respect to the ground face 1, will be of a maximum of 500 angstroms for a groove having the above dimensions.

The two materials of the active face may be considered to be in the same plane.

With this ground, heterogeneous substrate, the fabrication of the head can be continued in different ways.

In a first approach, starting from that face of the substrate which is opposite the active face, hollows are machined until the non-magnetic material of the gap is reached. This is shown in FIG. 5 where it is seen that the hollow 6 is wider than the gap 7 including from the dielectric material 5. The depth of the gap may be smaller than 200 $\mu$m.

Then, as shown in FIG. 6, a counter-piece 8 to close the magnetic field may be fixed to that face of the substrate which is opposite the active face. The counter-piece may be of the same nature as the substrate 2. It can be fixed to the substrate by bonding. The material that provides the bonding may be a glass with a melting temperature below that of the glass used to make the gap, the bonding being then done by a raising the temperature. The material that provides the bonding may also be a polymer containing a ceramic powder.

The magnetic head may then be finished according to the teaching of the already mentioned patent applications. FIG. 7 shows a magnetic reading/recording head fitted with its coil 13, with its two magnetic poles, formed from the substrate 2, the bearing the references 11 and 12. An alternative method of fabrication would consist in placing the coil before bonding the counter-piece 8.

A second approach to finishing the fabrication of the magnetic head consists in thinning out the substrate 2 until the continuity of the ferrite part is eliminated. This is shown in FIG. 8, where the two magnetic poles 21 and 22 are separated by the gap 20. The surface quality of the face opposite the active face 1 does not need to be very good. The depth of the gap may be of the order of 200 $\mu$m. The thinning out of the substrate may be obtained by diamond grinding.

As with the first approach, a counter-piece 25 (U-shaped) to close the magnetic field is fixed to the magnetic poles 21 and 22, as shown in FIG. 9.

The magnetic head can then be finished according to the teaching of the already mentioned patent applications. FIG. 10 shows a magnetic recording/reading head fitted out with its coil 26. An alternative embodiment would consist in placing the coil in an arm of the counter-piece, before fixing it to the magnetic poles.

Thus there is described, with respect to several embodiments, a method for fabricating magnetic read/record heads, as described more particularly in the claims which follow.

What is claimed is:

1. A method for fabricating at least one magnetic reading/recording head having two magnetic poles from a substrate made of magnetic material, the magnetic head having an active face defined by the magnetic poles of the head separated by a gap, comprising the steps:

making a groove having a predetermined width on a face of the substrate designed to become the active face of the head;

grinding the face of the substrate that has the groove to provide a planar surface; then filling the groove with a non-magnetic material designed to form the gap to a level where the non-magnetic material juts out of the groove;

grinding the material that juts out until the planar surface of the substrate is reached and the ground surface of the material is coplanar with said planar substrate;

machining the substrate from a face other than the active face to obtain a gap of a predetermined depth;

fixing, on the magnetic poles, a part to close the magnetic field; and, positioning a coil in the magnetic circuit formed by the poles and the closing part.

2. A method according to claim 1, wherein the positioning step is done before the fixing step.

3. A method according to claim 1 wherein said non-magnetic material is in the form of a rod which is first placed on the groove, and then introduced into the groove.

4. A method according to claim 3, wherein the introduction of said non-magnetic material into the groove is effected by heating the rod to a temperature that causes it to melt.

5. A method according to claim 1, wherein the machining and fixing steps are conducted as follows:

machining a hollow from that face of the substrate which is opposite the active face, until said non-magnetic material is reached and a gap of a determined depth is obtained; and, fixing to the magnetic poles demarcated by said hollow the magnetic field closing part.

6. A method according to claim 1, wherein the machining and fixing steps are conducted as follows:

thinning out the substrate from a face of the substrate which is opposite the active face until two magnetic poles, separated by a gap of a determined depth, are obtained; and, to the magnetic poles a U-shaped part for closing the magnetic field.

7. A method according to claim 1, wherein the fixing of the magnetic field closing part to the magnetic poles is done by bonding.

* * * * *